United States Patent [19]
Atwater

[11] 3,776,399
[45] Dec. 4, 1973

[54] AUTOMATIC WAREHOUSING SYSTEM

[75] Inventor: Wayne G. Atwater, Willoughby, Ohio

[73] Assignee: The Triax Company, Cleveland, Ohio

[22] Filed: Sept. 29, 1972

[21] Appl. No.: 293,643

Related U.S. Application Data

[63] Continuation of Ser. No. 69,871, Sept. 4, 1970, abandoned.

[52] U.S. Cl............................................ 214/16.4 A
[51] Int. Cl. .......................................... G05b 19/14
[58] Field of Search.................. 214/16.4 R, 16.4 A, 214/16.4 C

[56] References Cited
UNITED STATES PATENTS

| | | | |
|---|---|---|---|
| 3,033,392 | 5/1962 | Baumann | 214/16.4 A |
| 3,526,326 | 9/1970 | Castaldi | 214/16.4 Z |
| 3,531,705 | 9/1970 | Rosin | 318/567 |

OTHER PUBLICATIONS
Triax Advertisement; Mechanical Storage and Handling Systems Magazine; June, 1962.

*Primary Examiner*—Gerald M. Forlenza
*Assistant Examiner*—George F. Abraham
*Attorney*—George S. Baldwin et al.

[57] ABSTRACT

An automatic warehousing system including a storage frame area of horizontally and vertically oriented storage volumes with a mechanized load carrier movable alongside the storage volumes for handling loads at selected storage volumes. The load carrier is adapted to be controlled from an operator's control area located within the confines of the storage frame area. Inbound and outbound conveyor mechanisms disposed beneath the storage volumes operate to move stock to and from respective inbound pickup and outbound discharge stations, which are also located within the storage frame area beneath the storage volumes. An order picking work station is also located within the storage frame area adjacent to or readily accessible to the control area, for the placing thereon of order picked stock from the load carrier, with an output conveyor coacting with the order picking station for accumulating order picked stock orders thereon and moving such order picked stock out of the storage frame area. The purpose of the system is to provide for more expeditious operation of an automatic warehousing system and for more effective and efficient utilization of the floor area occupied by the storage frame of the system.

14 Claims, 5 Drawing Figures

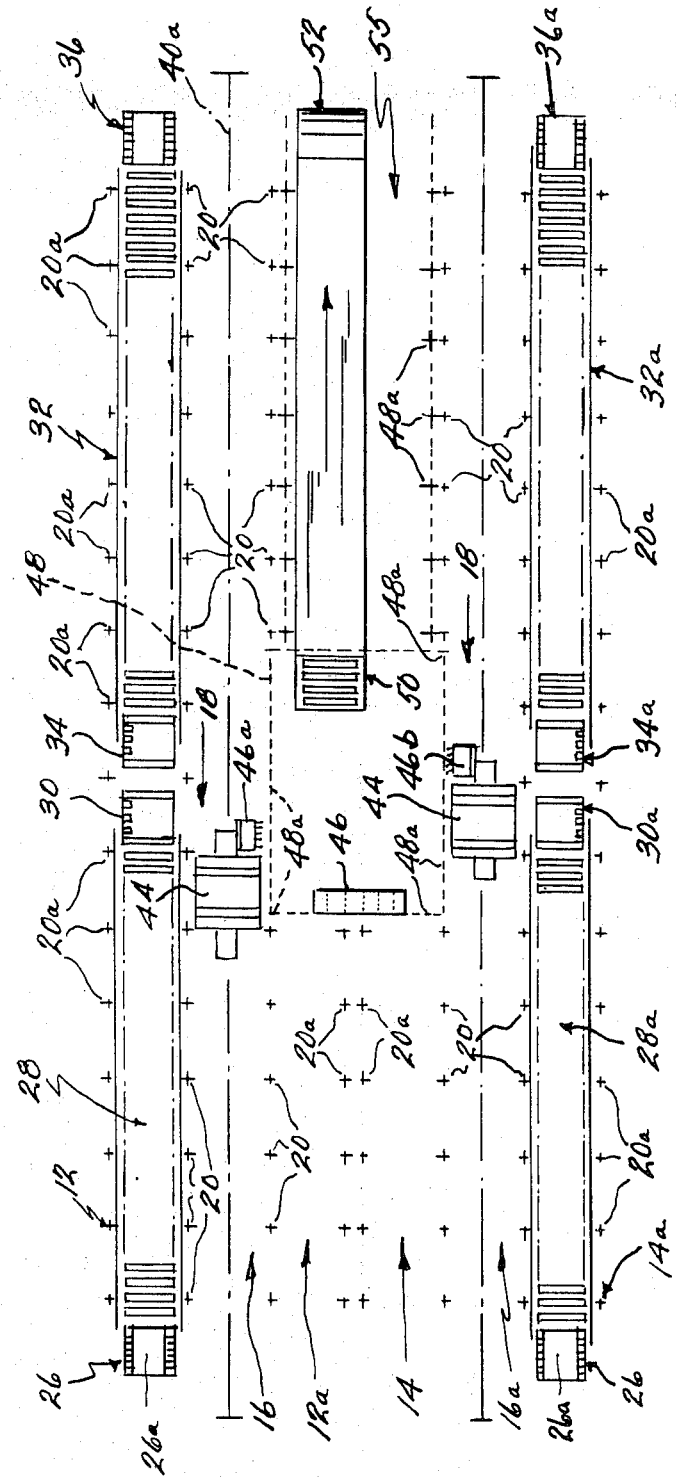

AUTOMATIC WAREHOUSING SYSTEM

This application is a continuation of application Ser. No. 69,871, filed Sept. 4, 1970, which is now abandoned.

This invention relates in general to automatic warehousing systems for storing and unstoring loads by transferring them between a movable load carrier and a storage frame, and more particularly relates to a warehousing system which includes inbound and outbound conveyor mechanisms, and order picking station, and an operator's control area which may include control console mechanism for remotely controlling the load carrier, all of which are disposed within the confines of the storage frame area, for improving the effective operation of the warehousing complex and increasing the effective utilization of the floor area occupied by the storage frame of the system.

BACKGROUND OF THE INVENTION

Automatic warehousing systems generally comprise opposing storage frames having vertically and horizontally arranged load support means or storage bins, opening at vertical work faces disposed on either side of an intermediate aisle or travel zone. An automatically controlled mechanized load carrier is movable along the aisle or travel zone and has an elevator for transporting a load to different levels in a storage frame, with the elevator generally having an extractor or load handling mechanism mounted thereon for transferring a load between the elevator and the selected storage volume of the selected storage frame, and vice versa.

The storage frame assembly may have inbound conveyor mechanism associated therewith for moving stock to an associated pickup and discharge station for handling by the load carrier, and also may have outbound conveyor mechanism for moving the stock removed from selected storage volumes away from the storage frame area. Generally such conveyors project laterally of the storage frame assembly and the pickup and discharge station or stations to which, and from which, the load carrier moves in its load handling movement are generally disposed horizontally or laterally from the storage frame area, all of which mechanisms and station installations require considerable floor space.

SUMMARY OF THE INVENTION

The present invention provides an automatic warehousing system wherein the effective operation of the system is improved, and which more efficiently utilizes the floor space occupied by the storage frame of the system, and wherein such auxiliary components, such as the inbound and outbound conveyor mechanisms and the pickup and discharge station structure, and also the operator's control console in a remote control installation, instead of being disposed laterally of the storage frame are disposed within the confines of the storage frame, thus providing an improved and more compact arrangement of warehousing system.

Accordingly, an object of the invention is to provide a novel, automatic warehousing system.

Another object of the invention is to provide a novel warehousing system wherein inbound and outbound conveyor mechanisms are adapted to coact with inbound pickup and outbound discharge stations for the system, for moving stock into and moving stock out of the storage frame area of the system, and wherein such inbound and outbound conveyor mechanisms are disposed within the confines of the storage frame area beneath storage volumes therein.

A still further object of the invention it to provide an automatic warehousing system of the latter discussed type which is adapted for remote control of the load carrier of the system, and wherein the control area is disposed within the confines of the storage frame area of the system beneath storage volumes therein.

A still further object of the invention is to provide an automatic warehousing system of the latter discussed type which includes an order-picking station for receiving order picked stock thereon, and wherein an outbound conveyor mechanism coacts with the order picking station for accumulating order-picked stock thereon and for moving such order-picked stock out of the warehousing system, and wherein such inbound pickup station, outbound discharge station and order picking work station and coacting outbound conveyor mechanism are disposed within the confines of the storage frame area of the system beneath storage volumes therein.

A still further object of the invention is to provide an automatic warehousing system including a storage frame utilizes which more effectively and efficiently tuilizes the floor area occupied by the system, and wherein the load carrier of the system is adapted for remote control with the remote control console mechanism and operator's work station area being disposed generally adjacent to or readily accessible to the inbound pickup stations, the outbound discharge stations, and the order picking station or stations of the system, for more expeditiously utilizing the operator's time.

Other objects and advantages of the invention will be apparent from the following description taken in conjunction with the accompanying drawings wherein:

BRIEF DESCRIPTION OF THE DRAWINGS

FIG. 5 is a view generally similar to FIG. 1 except that the load carrier units each has a control console mounted thereon for movement therewith, which control consoles have control mechanism thereon for controlling the movement of the respective load carrier in its load handling cycles, and wherein such control consoles are readily accessible to the control area within the confines of the storage frame, for actuation by the operator stationed in the control area; in other words in this instance the load carriers are at least not entirely remotely controlled.

DESCRIPTION OF PREFERRED EMBODIMENTS:

Referring now again to the drawings, the warehousing system may comprise a plurality of generally parallel storage sections 12, 12a, 14, 14a, defining between each pair thereof, in the embodiment illustrated, an aisle or travel zone 16 or 16a, so as to permit a motorized load carrier indicated generally at 18 to be moved along the aisle or travel zone and to insert loads L into and withdraw loads from the storage volumes of the respective storage frame sections. While a load carrier has been shown in each travel zone, it will be understood that transfer mechanism of known construction could be utilized for transferring a load carrier from one travel zone to another travel zone, for the servicing of a plurality of travel zones.

Figure 4:
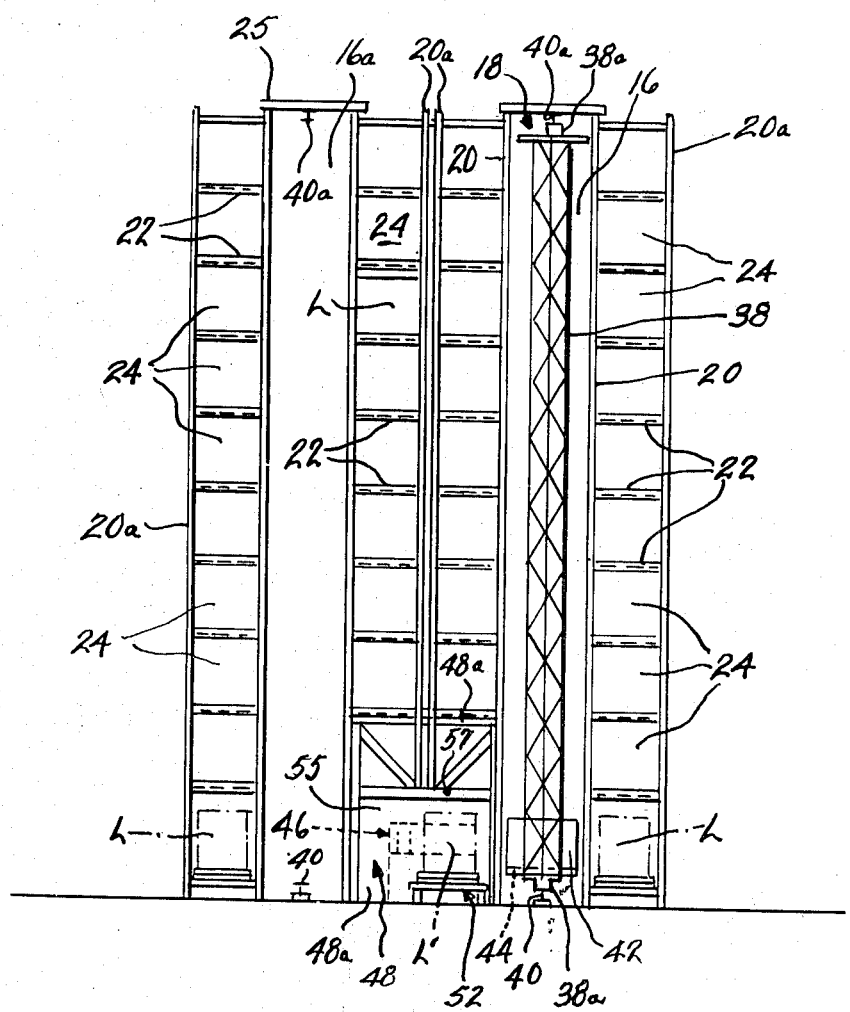
FIG. 4 is an end view of the warehousing system taken generally along the plane of line 4—4 of FIG. 1 looking in the direction of the arrows, and illustrating in one aisle thereof one of the load carrier mechanisms.

Each storage section may be constructed of a plurality of vertically extending, laterally spaced posts 20, 20a, spaced apart by a plurality of generally horizontally oriented load supporting members 22 (FIG. 4) which in the embodiment illustrated comprise horizontally extending load supporting rails, defining a plurality of the aforementioned storage volumes or bins 24. Confronting storage sections may be connected by overhead stringers 25. The storage frame consturction may be of the general structural type disclosed in assignee's U.S. Pat. No. 3,371,804, issued Mar. 4, 1968 and entitled "AUTOMATIC WAREHOUSING SYSTEM" and reference may be had thereto for a more detailed discussion of structural details of a storage frame section.

Disposed at an end of one of the storage sections 12 or 14a may be a load input station 26, wherein loads of stock are adapted to be placed on an input stand 26a for movement into the storage frame area for subsequent handling by the load carrier mechanism of the system. Station 26 may be of conventional construction and is adapted to be serviced either by some other conveyor mechanism not shown, or by means of lift trucks, overhead conveyors or the like which are operable to place loads of incoming stock on the stand, and wherein such loads may be moved either by some suitable power means or may be moved manually onto the inbound conveyor mechanism 28 or 28a associated with each respective input stand. As can be seen from FIG. 1, the input stands of stations 26 are not disposed within the confines of the storage frame area, but instead project outwardly therefrom, but adjacent to the storage frame area.

The coating inbound conveyor mechanisms 28 and 28a are preferably power actuated, such as, for instance, electric power actuated roller or belt conveyors and are disposed within the confines of the storage frame area and below overlying storage volumes therein. Such conveyor mechanisms occupy the lower area of the storage frame, with there being provided sufficient space above the surface of the conveyor mechanisms so that stock can move along the conveyor mechanisms without interference with the structural components of the storage frame. At the other end of each of the inbound conveyor mechanisms 28 and 28a there is provided an inbound pickup stand 30, 30a which defines one of the beginning or starting positions of the associated load carrier mechanism 18, and from which stand the respective load carrier is adapted to remove loads and move them to the selected storage volume for depositing in the storage frame. The pickup stands 30, 30a are disposed within the confines of the storage frame area beneath overlying storage volumes therein.

Outbound conveyor mechanisms 32, 32a are also provided which are disposed within the confines of the storage frame area beneath overlying storage volumes therein. Loads removed from the storage volumes of the storage frame by the respective load carrier 18 are adapted to be positioned by the load carrier on the respective outbound discharge stand 34, 34a, from whence the loads are moved preferably by suitable power means (not shown) onto the respective outbound conveyor mechanism 32 or 32a to the respective output stand 36 or 36a, from whence the stock load can be moved by other conveying means (not shown) such as conveyors, or lift trucks, or cranes, away from the warehousing system for further handling. As can be seen, the output stands 36, 36a extend outwardly of the confines of the storage frame area for ready accessibility by the aforementioned conveying means or lift trucks, for removal of the loads from stands 36, 36a.

The mechanized load carrier 18 may comprise a horizontally movable conveyor frame 38 (FIG. 4) which is supported and guided for horizontal movement as by means of flanged wheels 38a on guide tracks 40, 40a running parallel to and in the respective travel zone 16 or 16a. The upper rail 40a may be supported on cross stringers 25 (FIG. 4) of the storage frame structure, while the lower rail 40 may be mounted on the floor. A vertically movable elevator 42 is adapted for vertical movement with respect to the conveyor frame 38 and the elevator mounts a laterally extensible extractor or load handling mechanism 44 thereon, for handling loads at the selected storage volume, and for moving loads from the storage frame to the selected work stand and vice versa.

Load carrier 18 in the embodiment illustrated is adapted for remote control, and in this connection there is provided a remote control console 46 (FIGS. 1, 2 and 4) which is adapted for operation by a workman for controlling the movements of the load carrier in its respective travel zone. Control console 46 is located within the confines of the storage frame area at the operator's work station area 48 (FIG. 1), with such operator's area 48 being disposed, in the embodiment illustrated, at floor level and being defined by support structure 48a for supporting the overlying storage volumes of the associated storage frame sections. Also located in area 48 is an order picking work station stand 50 onto which may be deposited order picked loads of stock. Order picking means stock loads which may not be all of one type or number as stored in each of the storage frame bins but wherein generally manual selection of partial stock loads has occurred either by an operator riding on the load carrier mechanism and collecting stock items from selected stock loads in the storage frame, or by the operator removing stock from full stock loads removed from its storage bin by the load carrier and brought by the latter to the operator's work area 48, at which time the operator manually removes the desired number of items and places them on outbound order picking station 50, to form the order picked loads. The order picked stock loads L' (FIG. 2) may then be manually or by means of suitable power means, moved onto the accumulating and outbound order picking conveyor mechanism 52 which coacts with the order picking stand 50 and which can be utilized for accumulating order picked stock and/or moving the order picked stock out of the warehousing system. Conveyor 52 may be power driven and may be a conventional roller or belt conveyor which moves the stock in the direction of the arrow illustrated, where it projects outwardly of the storage frame and from whence such order picked stock can be handled by other suitable conveying mechanisms such as, for instance, fork trucks or overhead cranes, for movement to a desired location remote from the storage frame; conveyor 52 could also move such order picked stock to some remote area, such as for instance a shipping room or location, for convenient separation into shipping orders.

Figure 1:
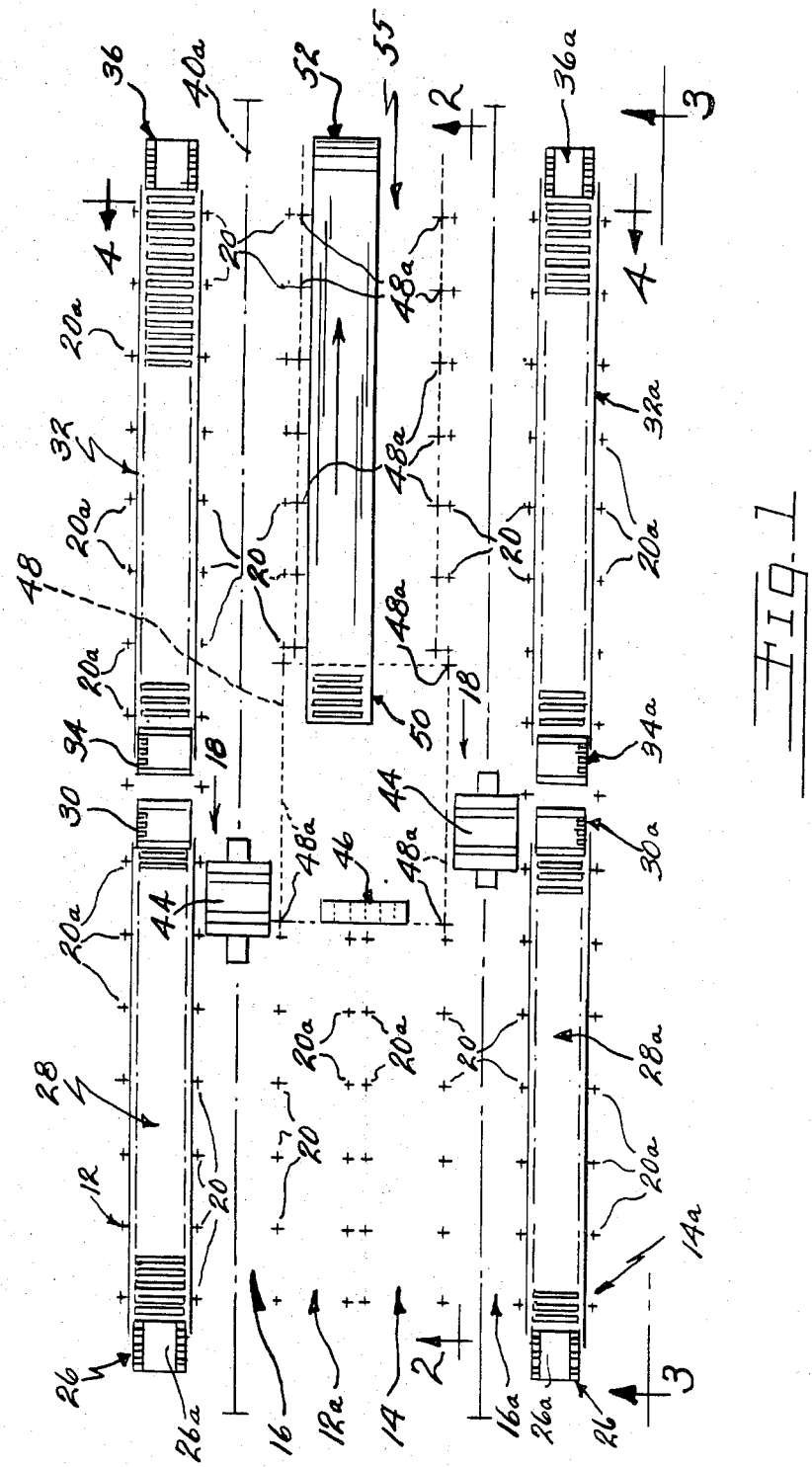
FIG. 1 is a diagrammatic top plan view of an automatic warehousing system embodying the invention and which includes plural aisles or travel zones.
Figure 2:
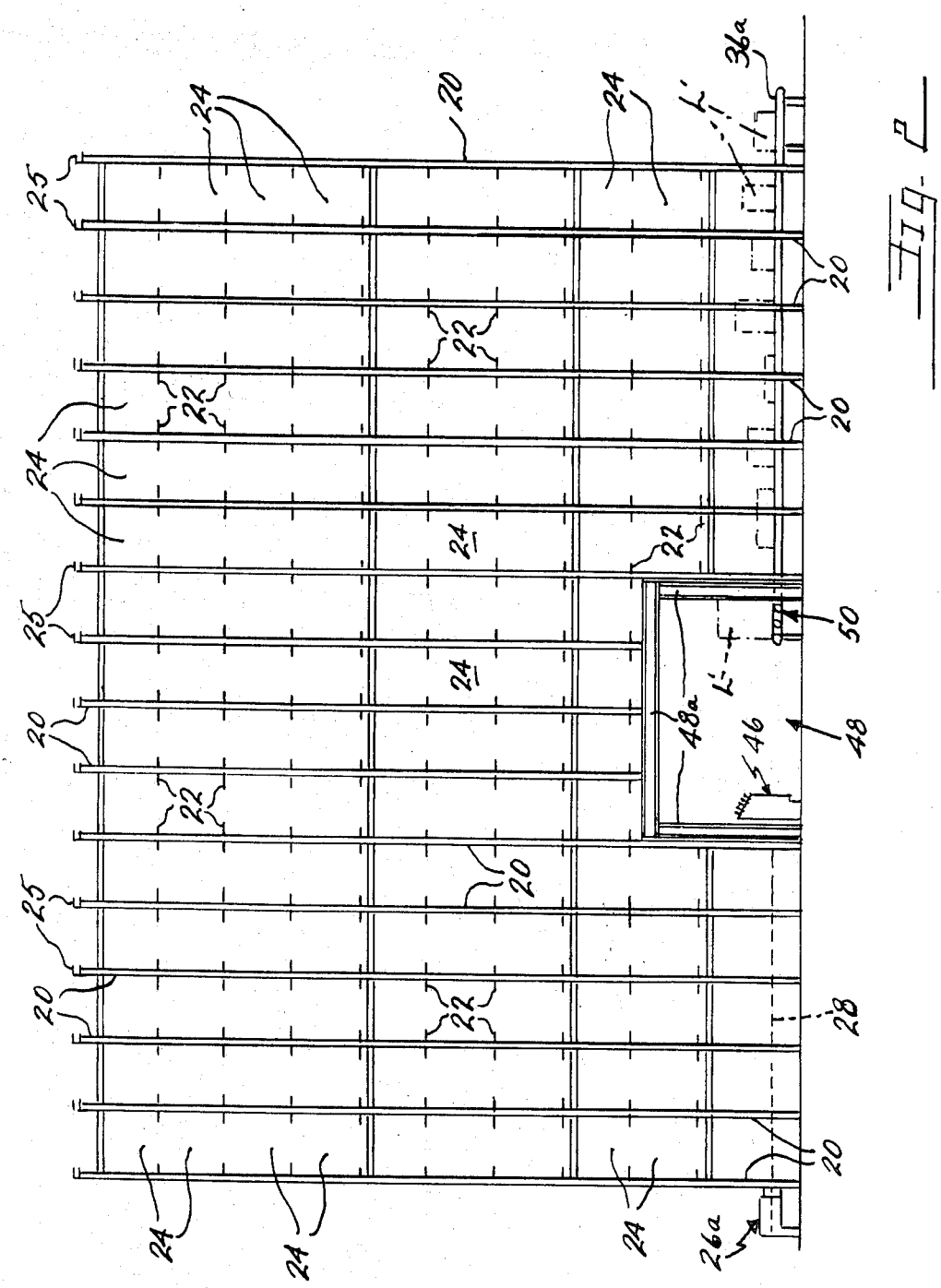
FIG. 2 is a view taken generally along the plane of line 2—2 of FIG. 1 looking in the direction of the arrows and illustrating in particular the operator's control console area disposed within the confines of the storage frame area of the system together with the order picking work station and associated outbound conveyor mechanism coacting therewith.
Figure 3:
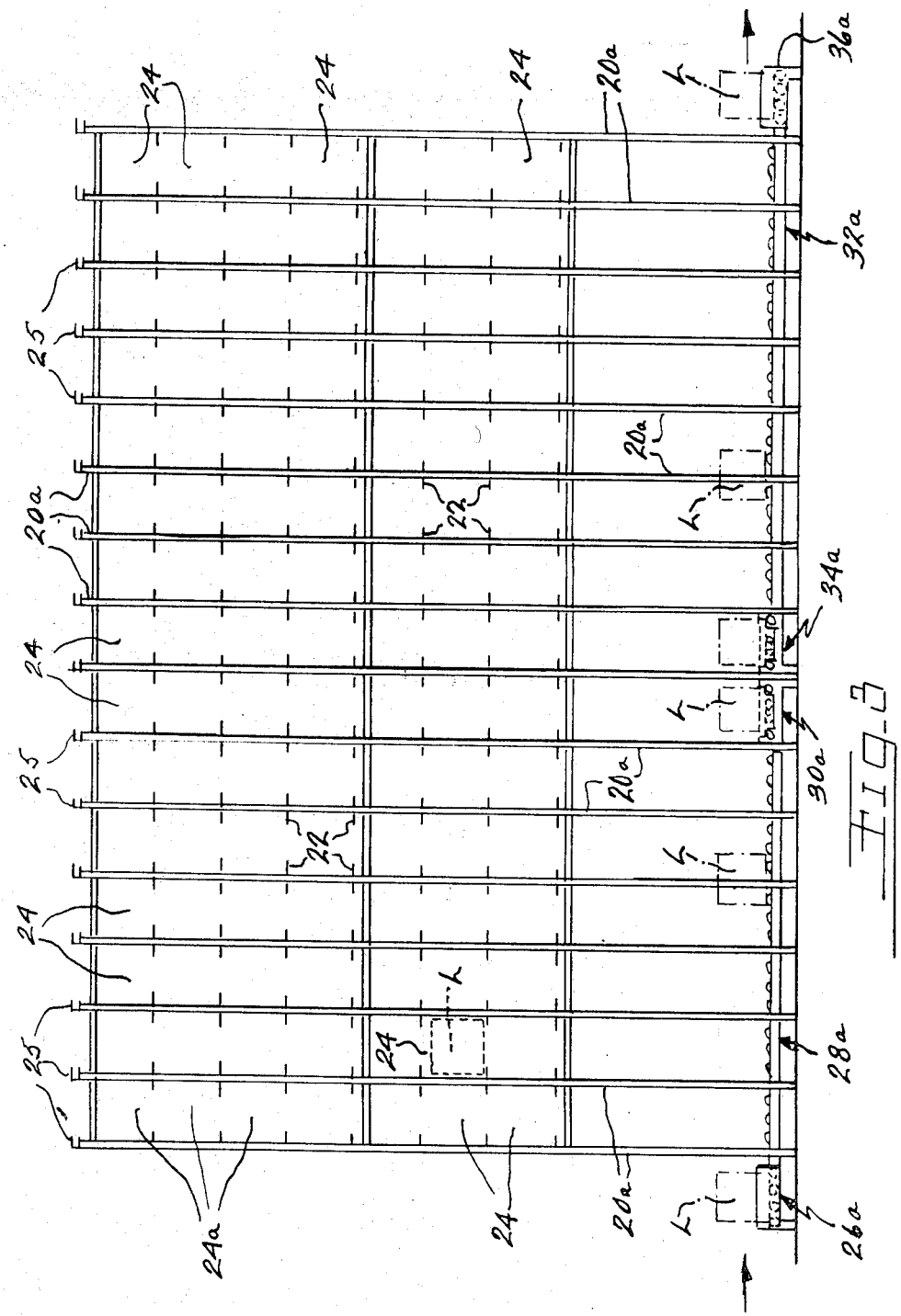
FIG. 3 is an elevational view taken generally along the plane of line 3—3 of FIG. 1 showing a storage frame bank or section with the inbound and outbound conveyor mechanisms associated with the storage frame section and disposed within the confines of the storage frame area beneath the storage volumes therein.

As can be best seen from FIG. 1, the operator's area 48 defined by opened sided structure 48a is readily accessible to both travel zones 16, 16a and to all of the inbound pick up stations 30, 30a and outbound discharge stations 34, 34a, as well as to the order picking station 50 and to the load carrier units when the later are disposed at their beginning or "home" positions in the respective travel zone. An access tunnel 55 FIGS. 1 and 4) is preferably provided running along side order picking conveyor mechanism 52 and providing ready communication and accessibility to the operator's work area 48 from exteriorly of the storage frame. Tunnel 55 can be defined by ceiling stringers 57 supported on uprights 48a positioned adjacent the respective storage frame columns 20.

With such an arrangement, extensions beyond the body or area of the storage frame structure are kept to a minimum, thereby more efficiently utilizing the floor space of the warehousing structure. The operator being disposed midway between two aisles or travel zones can order pick from both aisles and from both load carrier mechanisms, and can be in a position to identify all incoming and outgoing loads, since the loads are picked up at the inbound pick up stations 30 or 30a for transfer by the load carrier into the storage frame, and since full loads removed from the storage frame by the load carriers are deposited at outbound stations 34 or 34a for removal from the system. The home positions for the respective load carrier can be at either station 30, 30a or station 34, 34a. Since such home position or positions are generally midway in the storage frame area, the cycle time to store and retrieve loads is shortened, thereby increasing the available actuating rate for the load carrier.

FIG. 5 illustrates a system similar to that of FIGS. 1 to 4 except that the load carriers each have a control console 46a, 46b mounted thereon for movement therewith and adapted for actuation or programming by an operator for controlling the movement of the respective load carrier in its load handling cycle. Consoles 46a, 46b are readily accessible from the work area 48.

From the foregoing discussion and accompanying drawings, it will be seen that the invention provides a novel automatic warehousing system which efficiently utilizes the floor area of the system, and wherein inbound and outbound conveyor mechanisms and a control area for operating and controlling the automatic load carrier mechanisms of the system, and an order picking station, are disposed within the confines of the storage frame area so as to minimize extensions or projections from the storage frame, and wherein location of the operator's work area is so arranged that an operator can readily control and supervise and order pick from a plurality of travel zones or aisles in a warehousing system.

The terms and expressions which have been used are used as terms of description and not of limitation, and there is no intention in the use of such terms and expressions of excluding any equivalents of any of the features shown or described or portions thereof, and it is recognized that various modifications are possible within the scope of the invention claimed.

What is claimed is:

1. In an automatic warehousing system comprising a storage frame defining a plurality of horizontally and vertically arranged storage volumes adapted for storing loads therein, a track guided mechanized load carrier movable in a travel zone alongside the storage frame for inserting loads into and removing loads from selected of said storage volumes, control means for said load carrier for selectively controlling the positional movements thereof in its operation of depositing loads into and withdrawing loads from selected storage volumes, said control means being located in a stationary control area defined by an at least partially open sided stationary structure disposed directly beneath certain of said storage volumes in said storage frame, said control area being disposed adjacent said travel zone with the latter being readily and quickly accessible to a workman operator stationed at said control area beneath said certain storage volumes, conveyor mechanism for receiving loads and moving them into accessible relation to said load carrier and for receiving loads from said load carrier and moving the loads out of the system, pick-up and discharge station means adjacent said travel zone coacting with said conveyor mechanism for positioning loads to and from said load carrier, said conveyor mechanism and said station means being disposed within the confines of said storage frame in underlying relation to storage volumes thereof and being readily accessible to a workman operator stationed at said control area.

2. A system in accordance with claim 1 wherein said control means includes a control console having control elements thereon for controlling said load carrier, said control console being remote from said load carrier and disposed in said control area within the confines of said storage frame.

3. A system in accordance with claim 1 wherein said structure disposed beneath certain of said storage volumes in said storage frame includes defining columns supporting the overlying storage volumes of the storage frame, said storage volumes of said storage frame being defined in part by a longitudinal row of spaced, substantially vertical posts disposed along said travel zone, at least certain of said columns being aligned in a longitudinal direction with said posts.

4. A system in accordance with claim 1 with said storage frame comprising storage structure disposed on opposite sides of said travel zone, the storage volumes of each storage structure opening toward said travel zone, and with said load carrier being operable to service both sides of said travel zone to service the storage structure on both sides of travel zone.

5. In an automatic warehousing system comprising a storage frame defining a plurality of horizontally and vertically arranged storage volumes adapted for storing loads therein, a track guided mechanized load carrier movable in a travel zone alongside the storage frame for inserting loads into and removing loads from selected of said storage volumes, control means for said load carrier for selectively controlling the positional movements thereof in its operation of depositing loads into and withdrawing loads from selected storage volumes, said control means including a stationary control area defined by an at least partially open sided stationary structure disposed directly beneath certain of said storage volumes in said storage frame, said control area being disposed adjacent said travel zone with the latter being readily and quickly accessible to a workman operator stationed at said control area, conveyor mechanism for receiving loads and moving them into accessible relation to said load carrier and for receiving loads from said load carrier and moving the loads out of the system, pick-up and discharge station means adjacent said travel zone coacting with said conveyor mechanism for positioning loads to and from said load carrier, said conveyor mechanism and said station means being disposed within the confines of said storage frame in underlying relation to storage volumes thereof and being readily accessible to a workman operator stationed at said control area, said storage frame comprising storage structure disposed on opposite sides of said travel zone, the storage volumes of each storage structure opening toward said travel zone, and with said load carrier being operable to service both sides of said travel zone to service the storage structure on both sides of said travel zone and wherein said station means includes an inbound pick-up stand disposed laterally of said travel zone and coacting with said conveyor mechanism for receiving inbound loads from said conveyor mechanism, said conveyor mechanism extending substantially parallel to said travel zone beneath overlying storage volumes, said inbound stand defining a starting position for said load carrier from which the latter moves in its operation of storing a load in said storage frame, said stand being totally disposed within the confines of said storage frame directly beneath overlying storage volumes.

6. A system in accordance with claim 5 wherein said station means includes an outbound discharge stand disposed laterally of said travel zone and coacting with said conveyor mechanism for receiving outbound loads removed from said storage frame by said load carrier for movement out of said system, said outbound stand defining an alternate starting position for said load carrier from which the latter moves in its operation of removing a load from storage in said storage frame, said outbound stand being disposed totally within the confines of said storage frame.

7. A system in accordance with claim 1 wherein said control area is at floor level and includes control elements for actuation by the workman operator to control the movement of said load carrier in handling loads, and an order picking station disposed in said control area adapted to receive order picked loads from loads on said load carrier, said order picking station being readily accessible to the workman operator stationed at said control area for order picking by said operator, and said station means and said conveyor mechanism also being supported at floor level.

8. A system in accordance with claim 7 including a conveyor mechanism coacting with said order picking station for moving loads from said order picking station out of said system, the last mentioned conveyor mechanism being disposed within the confines of said storage frame beneath storage volumes therein except at its distal end where it projects out of the storage frame.

9. A system in accordance with claim 7 including a plurality of generally parallel extending travel zones of a height extending from floor level to the upper reaches of said storage frame adapted for providing for movement of the load carrier therein, for handling loads, and with said storage frame comprising storage frame sections disposed on opposite sides of each of said travel zones, guide means at said floor level disposed in each of said travel zones for supporting the load carrier for movement alongside said storage frame sections, said control area being so oriented adjacent said travel zones within the confines of said storage frame so as to provide ready accessibility at said floor level to either of said travel zones from said control area.

10. A system in accordance with claim 7 including access tunnel means at floor level communicating said control area within said storage frame to exteriorly of said storage frame, said access tunnel means providing for movement of workmen to and from said control area.

11. A system in accordance with claim 9 wherein each of said travel zones has an inbound pick up stand and an outbound discharge stand coacting therewith for moving loads onto and removing loads from the respective load carrier operating in the respective of said travel zones, the last mentioned pick up stand and discharge stand comprising said station means and being disposed within the confines of said storage frame in underlying relation to overlying storage volumes.

12. In an automatic warehousing system comprising a storage frame defining a plurality of horizontally and vertically arranged storage volumes adapted for storing loads therein, a track guided mechanized load carrier movable in a travel zone alongside the storage frame for inserting loads into and removing loads from selected of said storage volumes, control means for said load carrier for selectively controlling the positional movements thereof in its operation of depositing loads into and withdrawing loads from selected storage volumes, said control means including a stationary control area defined by at least partially open sided stationary structure disposed directly beneath certain of said storage volumes in said storage frame, said control area being disposed adjacent said travel zone with the latter being readily and quickly accessible to a workman operator stationed at said control area, conveyor mechanism for receiving loads and moving them into accessible relation to said load carrier and for receiving loads from said load carrier and moving the loads out of the system, pick-up and discharge station means adjacent said travel zone coacting with said conveyor mechanism for positioning loads to and from said load carrier, said conveyor mechanism and said station means being disposed within the confines of said storage frame in underlying relation to storage volumes thereof and being readily accessible to a workman operator stationed at said control area, said storage frame comprising storage structure disposed on opposite sides of said travel zone, the storage volumes of each storage structure opening toward said travel zone and with said load carrier being operable to service both sides of said travel zone to service the storage structure on both sides of said travel zone, and wherein said conveyor mechanism extends lengthwise generally parallel to the respective travel zone, and occupies the lower portion of the respective storage structure of the storage frame.

13. A system in accordance with claim 8 wherein said conveyor mechanism coacting with said order picking station extends lengthwise generally parallel to said travel zone and projects outwardly of the exterior of said storage frame whereby said outwardly extending end of said order picking conveyor mechanism is accessible for floor level to external conveying means for removal of loads disposed on said order pickup conveyor mechanism.

14. A system in accordance with claim 9 including a plurality of load carriers, each of said load carriers being adapted for movement in a respective of said travel zones for servicing the storage frame sections disposed along the respective travel zone.

* * * * *